UNITED STATES PATENT OFFICE.

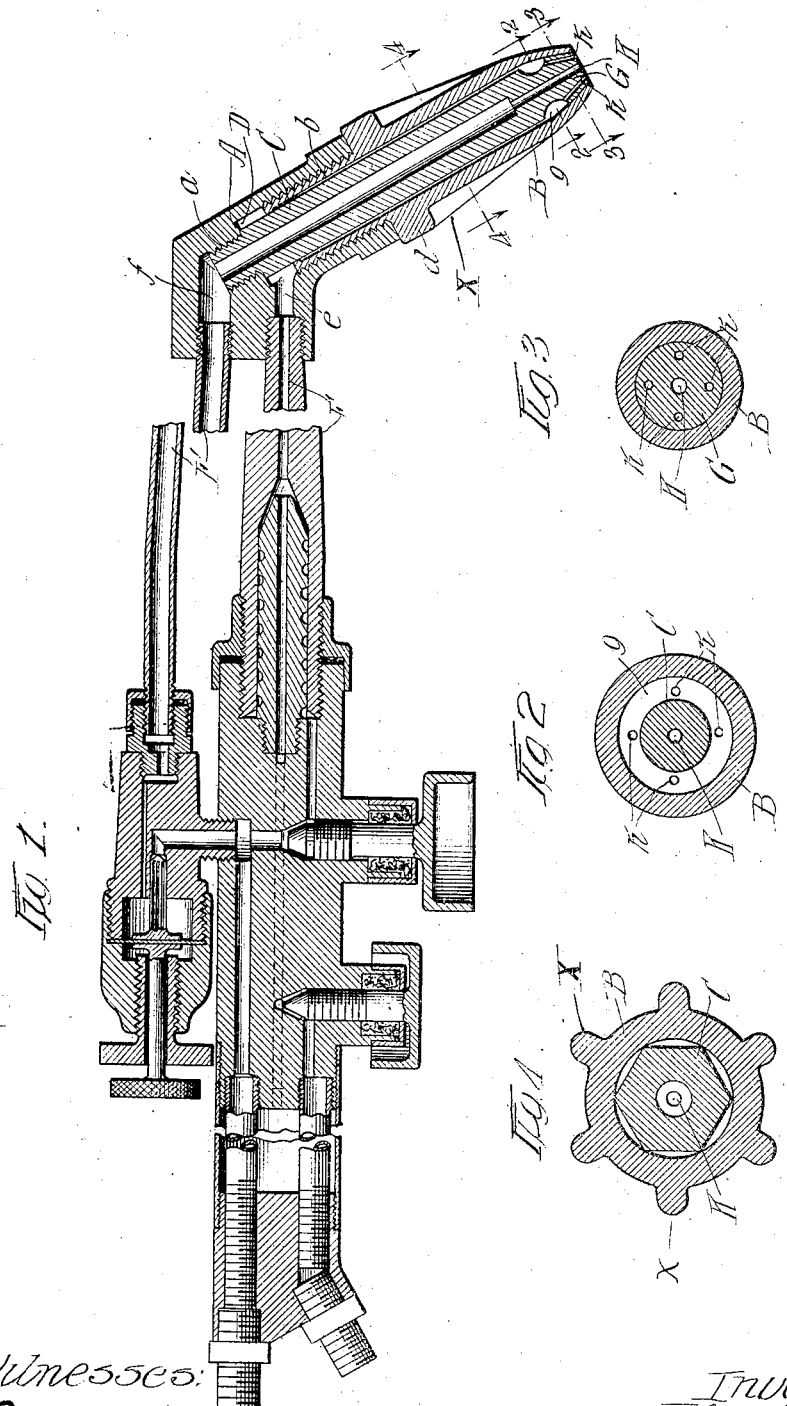

JOHN G. PETTIS, OF CHICAGO, ILLINOIS, ASSIGNOR TO THE IMPERIAL BRASS MANUFACTURING COMPANY, OF CHICAGO, ILLINOIS, A CORPORATION OF ILLINOIS.

TIP FOR COMBINED WELDING AND CUTTING TORCHES.

1,172,730.  Specification of Letters Patent.  Patented Feb. 22, 1916.

Application filed December 14, 1914. Serial No. 877,043.

*To all whom it may concern:*

Be it known that I, JOHN G. PETTIS, a citizen of the United States, residing at Chicago, in the county of Cook and State of Illinois, have invented new and useful Improvements in Tips for Combined Welding and Cutting Torches, of which the following is a full, clear, and exact description.

My invention relates to tips for combined welding and cutting torches, and particularly combined oxo-acetylene and oxygen gas torches.

The object of my invention is, principally, to so construct the discharge end and so arrange the discharge orifices in the end of the tip that the accumulation of carbon therein and consequent stoppage of any of said orifices or the burning away of any part of said discharge end will be avoided. This and other objects I accomplish by the means hereinafter fully described, and as particularly pointed out in the claims.

In the drawings: Figure 1 is a longitudinal section of a torch equipped with my improved tip. Fig. 2 is a transverse section taken on dotted line 2—2, Fig. 1. Fig. 3 is a section taken on dotted line 3—3, Fig. 1. Fig. 4 is a transverse section taken on line 4—4, Fig. 1, drawn to a larger scale.

My improved torch tip is generally adapted to be used in connection with the torch described in my co-pending application filed December 14, 1914, Serial No. 877,042, comprises an exterior casing consisting of an upper and a lower tubular section, indicated by A and B in the drawings. The bore of the lower portion of the upper section A is concentric to the axis thereof and extends to a point very near the upper end of the section, which latter portion extends at an obtuse angle to the lower portion of the same. The upper end of the bore $a$ of said upper section is reduced and the screw-threaded upper end of a longitudinally disposed tubular nozzle C is screwed therein. The lower wider portion of bore $a$ is screw-threaded from its lower end to a point a short distance below the reduced upper end of the same, and the upper reduced screw-threaded end $b$ of the lower section B is adapted to be screwed into bore $a$ until stopped by the circumferential collar $d$ surrounding the same. The screw-threaded upper end of the lower section is not as long as the wider part of bore $a$ into which it is screwed, and a chamber D is thus formed between the upper end of section B and the upper end of the wider portion of bore $a$ from which an oblique passage $e$ leads that extends out through the angular upper portion of the upper section to the end thereof. The entrance of this passage $e$ is screw-threaded and a suitable oxo-acetylene gas supply-pipe E is screwed into the same.

The upper end of the bore of nozzle C communicates with an oblique passage $f$ which is parallel to but independent of passage $e$, and extends to the end of the oblique upper portion of section A and has a supply-pipe F screwed into it that discharges oxygen gas into said passage and nozzle.

The body of the nozzle C is, preferably, hexagonal from its upper threaded end to a circumferential groove $g$ that surrounds it just above a head G on its lower end. The hexagonal shaped body of the nozzle enables it to fit snugly within the bore of the lower section of the casing, and at the same time leave longitudinal passages through which the oxo-acetylene gas is forced from chamber D into the annular chamber made by groove $g$, and from this annular chamber the gas is expelled through a series of equi-distant discharge orifices $k$, $k$, that extend from said annular chamber to the extremity of the head, preferably, parallel to the sides of the same. The bore of nozzle C is reduced in diameter at its lower end to provide the discharge orifice K, and oxygen gas is forcibly expelled from this orifice in the center of the series of the oxo-acetylene orifices.

In operation the presence of the annular chamber made by groove $g$ evens up the pressure of the gas just before it discharges from orifices $k$, $k$, and the convergence of said orifices causes the jets of gas issuing therefrom to combine and thoroughly mix with the oxygen gas issuing from said equidistant orifices at a suitable point away from the tip where the greatest heat is produced. Experience has demonstrated that very little carbon is produced in my improved tip, but when carbon is produced it first collects in said annular chamber, and should it collect in any of said orifices $k$ to such an extent as to materially interfere with the discharge of gas therethrough an explosion takes place in said chamber which clears said orifices.

The discharge end of the bore of the lower section B of the casing is tapered to form a seat for the obversely tapered circumference of the head G so that when the upper end of the nozzle is screwed home in the upper section, and the lower section B of said casing is screwed into the lower screw-threaded end of the upper section, the tapered circumferential sides of the head will fit tightly within the tapered mouth of the bore of the casing so that no gas can escape between the two parts. By making discharge orifices K and $k$ equidistant the end of the tip will heat evenly and the expansion of the metal at this point will be even. As no gas can escape around the sides of the head and issues only from the orifices therein, a greater heat at one point than at another is avoided and the burning away of the extremity of the tip is prevented. In addition to this feature of my invention, its construction is such that no sharp angles are presented which will be burned away by the intense heat and thus the durability of the tip is greatly increased.

In order to reduce the temperature of the tip as much as possible, the nozzle is made of brass and the casing is made of bronze. The bronze being a greater conductor of heat than the brass and more susceptible to the temperature of the outer atmosphere draws the heat from the brass and keeps the temperature of the tip lower than it would otherwise be, and in order to further accomplish this result, I provide the lower section B of the casing with longitudinal ribs or fins $x$ that extend from collar $d$ to about the tapered lower portion of said lower casing.

What I claim as new is:

1. A tip for gas torches comprising a tubular casing having an upper section and a lower section; said sections being screwed together, a tubular nozzle screwed into the upper section of the casing and extending through the lower section, said nozzle having a tapered head and a circumferential peripheral groove near its discharge end and also being provided with an axially extending discharge orifice, and a series of side discharge orifices extending from the circumferential peripheral groove outwardly through the head of said nozzle, and means for supplying different gases to said axially extending discharge orifices and said circumferential peripheral groove.

2. A tip for gas torches comprising a tubular casing having an upper section and a lower section, said sections being screwed together, a tubular nozzle screwed into the upper section of the casing and extending through the lower section, said nozzle having a tapered head and a circumferential peripheral groove near its discharge end and also being provided with an axially extending discharge orifice, and a series of side discharge orifices extending from the circumferential peripheral groove outwardly through the head of said nozzle and at converging angles to the axially extending discharge orifice, and means for supplying different gases to said axially extending discharge orifice and said circumferential peripheral groove.

3. A tip for gas torches comprising a tubular casing, a polygonal tubular nozzle extending longitudinally in said casing having a head provided with a circumferential groove near its discharge end, an axially extending discharge orifice, and a series of equi-distant discharge orifices leading from said groove and arranged concentrically to said central orifice, and means for supplying different gases to said central and to said surrounding series of orifices.

4. A tip for gas torches comprising a tubular casing, a polygonal tubular nozzle extending longitudinally in said casing and having a tapering head provided with a circumferential peripheral groove near its discharge end constituting an annular gas chamber, an axially extending discharge opening and a series of side discharge openings extending from the circumferential peripheral groove outwardly through said head, the body of the nozzle in the rear of the groove being separated slightly from the surrounding wall of the casing to provide a gas passage-way to said groove, and means for supplying different gases to the axially extending discharge, and the gas passage-way leading to the circumferential peripheral groove.

5. A tip for gas torches comprising a tubular casing, a polygonal tubular nozzle extending longitudinally in said casing and having a tapering head provided with a circumferential peripheral groove near its discharge end constituting an annular gas chamber, an axially extending discharge opening and a series of side discharge openings extending from the circumferential peripheral groove outwardly through said head, the body of the nozzle in the rear of the groove being separated slightly from the surrounding wall of the casing to provide a gas passageway to said groove and the forward portion of the casing being tapered to correspond to the tapering conformation of the head of the nozzle and fitted closely around the same, and means for supplying different gases to the axially extending discharge and the gas passageway leading to the circumferential peripheral groove.

In witness whereof, I have hereunto set my hand this 4th day of December, 1914.

JOHN G. PETTIS.

Witnesses:
 FRANK D. THOMASON,
 JOHN T. MILES.